(12) United States Patent
Bodkin

(10) Patent No.: US 7,157,802 B2
(45) Date of Patent: Jan. 2, 2007

(54) ELECTRICAL POWER SOURCE

(75) Inventor: W. Andrew Bodkin, Wellesley, MA (US)

(73) Assignee: Bodkin Design And Engineering LLC, Wellesley, MA (US)

( * ) Notice: Subject to any disclaimer, the term of this patent is extended or adjusted under 35 U.S.C. 154(b) by 0 days.

(21) Appl. No.: 10/966,734

(22) Filed: Oct. 15, 2004

(65) Prior Publication Data
US 2006/0017289 A1    Jan. 26, 2006

Related U.S. Application Data

(60) Provisional application No. 60/511,963, filed on Oct. 16, 2003.

(51) Int. Cl.
*F02B 63/04* (2006.01)
(52) U.S. Cl. ............ 290/1 R; 290/1 A; 290/1 E; 290/2; 290/1 C; 290/50; 290/54
(58) Field of Classification Search ............ 290/1 R, 290/1 A, 1 E, 50, 54; 60/2; 123/1 C
See application file for complete search history.

(56) References Cited

U.S. PATENT DOCUMENTS

| | | | | |
|---|---|---|---|---|
| 4,612,447 A * | 9/1986 | Rowe | ............ | 290/1 R |
| 5,087,824 A * | 2/1992 | Nelson | ............ | 290/1 A |
| 5,296,799 A * | 3/1994 | Davis | ............ | 322/35 |
| 5,334,898 A * | 8/1994 | Skybyk | ............ | 310/268 |
| 5,845,504 A * | 12/1998 | LeBleu | ............ | 392/485 |
| 6,177,746 B1 * | 1/2001 | Tupper et al. | ............ | 310/166 |
| 6,621,985 B1 * | 9/2003 | Thweatt, Jr. | ............ | 392/485 |
| 6,717,284 B1 * | 4/2004 | Lin | ............ | 290/53 |
| 6,770,992 B1 * | 8/2004 | Yamauchi et al. | ............ | 310/90.5 |
| 6,798,104 B1 * | 9/2004 | Kajiura et al. | ............ | 310/162 |

* cited by examiner

*Primary Examiner*—Darren Schuberg
*Assistant Examiner*—Iraj A. Mohandesi
(74) *Attorney, Agent, or Firm*—Lathrop & Gage LC

(57) ABSTRACT

An electrical power source is described. The electrical power source derives input power from a compressed gas which is fed into a transducer, generating electrical power. The compressed gas may be delivered to the unit by several means including manual pumps, thermal, chemical, or ammunition based sources, or connection to pressurized canisters. Optional power converting and feedback circuits and pneumatic valves serve to convert the raw output power into useful AC and DC output voltages, and to match the rate of power delivery to the applied electrical load.

20 Claims, 7 Drawing Sheets

ELECTRICAL POWER SOURCE

CROSS-REFERENCE TO RELATED APPLICATION

This application claims priority to U.S. provisional application Ser. No. 60/511,963 filed 16 Oct. 2003, which is hereby incorporated by reference.

U.S. GOVERNMENT RIGHTS

This invention was made in part with the support of the U.S. Government; the U.S. Government has certain rights in this invention as provided for by the terms of Grant #N00178-03-C-3093 awarded by the U.S. Navy.

BACKGROUND

Numerous applications exist for electrical power sources (e.g., a battery). One of these applications is within the field of emergency communications. Emergency communications are often required under less than ideal conditions, such as during natural and man-made disasters. Interruption of normal power sources (e.g., household power), and the importance of communicating quickly, can create situations in which power sources can be extremely valuable, for example the use of batteries to power radio or cellular communications during emergency situations.

Another application for electrical power sources occurs in modern military operations, which are increasingly reliant on portable electrical power sources for communication, night vision, and navigation systems (for example navigation systems employing the Global Positioning System). In the event that supply lines are cut off, battery power for these systems may be drained quickly, and access to electrical power can mean the difference between life and death of a soldier.

There are several known approaches to storing mechanical energy for electrical power supply. For small appliance operation, these include wind-up springs, flywheels and batteries. Wind-up springs are typical of the radio sets used in WWII, in which the operator winds a spring that slowly releases energy while the radio is used. Flywheels are often seen in commercial hand-operated flashlights, in which the flywheel is brought up to speed prior to operating the flashlight. The battery approach is exemplified in the automobile starter system, where a battery is used to store energy sufficient to crank over the motor. However, batteries are generally heavy in comparison to the output power they can produce, and can provide only a limited amount of power before they must be recharged or replaced. Other known approaches utilize gravitational potential energy, such as the wind-up clock that employs lifted weights; however, such devices do not lend themselves to light weight or portability due to their use of an elevated mass in a particular orientation.

SUMMARY OF THE INVENTION

In one embodiment, an electrical power source is provided. A manual pump (e.g., a foot pump) compresses gas (e.g., air) into a tank. A transducer pneumatically converts gas from the tank to electrical power, for example to regulate a desired output voltage usable by external devices (and/or to recharge batteries).

In one embodiment, a method of producing electrical power is provided, including: compressing gas for storage in a tank, and pneumatically converting gas from the tank into electrical power.

DETAILED DESCRIPTION OF DRAWINGS

Figure 1:
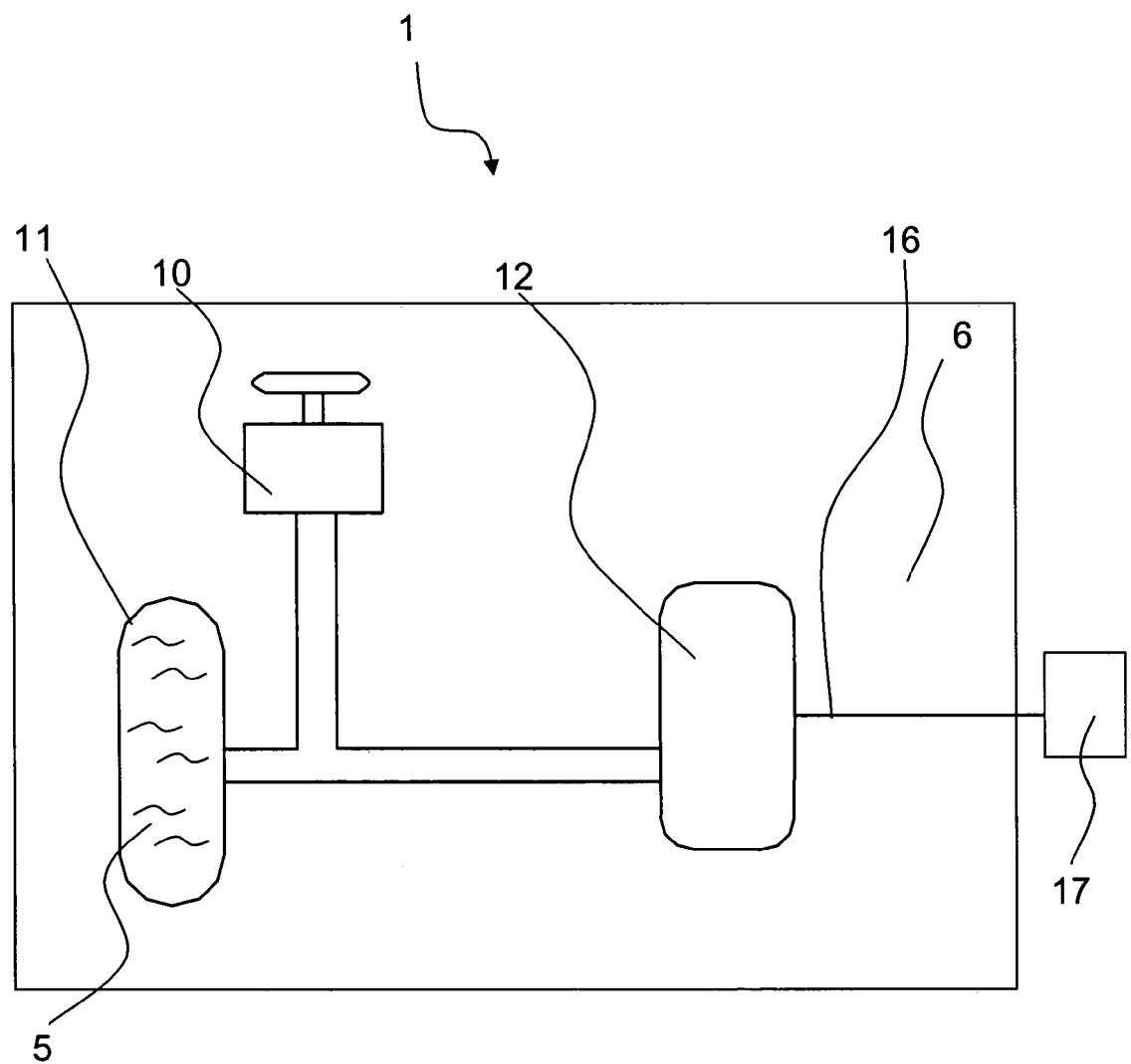
FIG. 1 shows one electrical power source.

FIG. 1 shows a power source 1. An inflator 10 compresses a gas 5 within a tank 11. In one example, inflator 10 in the form or a hand or foot pump converts air 6 into compressed gas 5. As used herein, "tank" means a vessel capable of receiving and holding compressed gas 5, including but not limited to solid walled vessels, bladders, balloons, tubes, and hoses (e.g., a fire hose). Operationally, compressed gas 5 flows from tank 5 through transducer 12, causing pneumatic action that is converted into electrical power; the electrical power is for example communicated to an external appliance 17 via an electrical power line 16, as shown.

Figure 2:
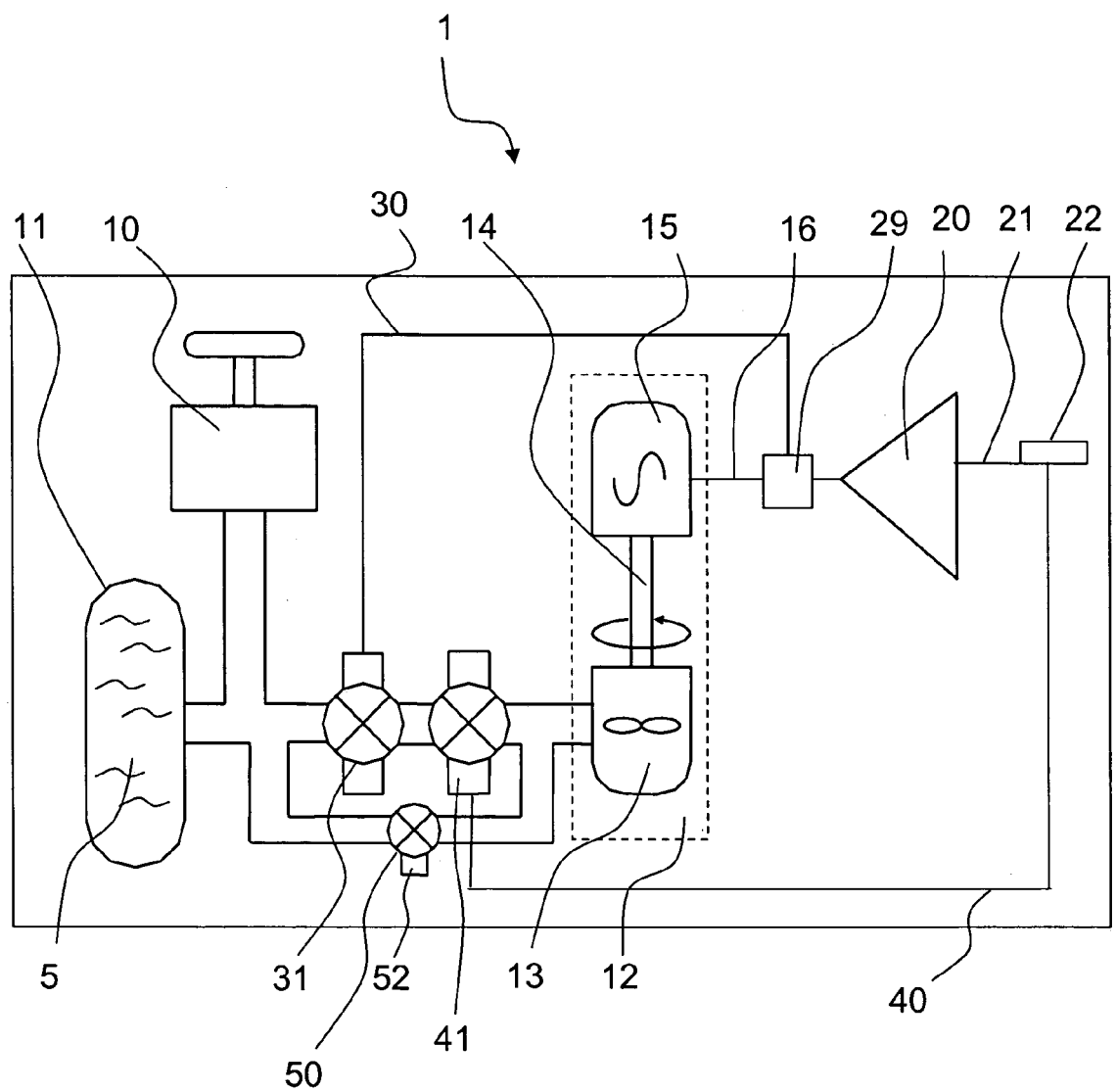
FIG. 2 illustrates exemplary detail of one embodiment of the electrical power source of FIG. 1.

FIG. 2 shows exemplary features of power source 1, in accord with various embodiments. An inflator in the form of a manual hand pump 10 compresses gas 5 into tank 11. The compressed gas 5 releases to transducer 12 through pneumatic control valves 31 and 41. In FIG. 2, transducer 12 includes a motor 13, shaft 14 and generator 15. Electrical power produced by generator 15 is output on electrical line 16; it is converted by electronics 20 so as to provide an AC and/or DC output voltage at a desirable voltage level (e.g., RMS voltage in the case of AC). The output voltage is for example provided through an electrical outlet 22. The output voltage may be 120V AC or 12V DC, for example.

In one illustrative embodiment, electrical outlet 22 triggers pneumatic control valve 41 through a mechanical linkage 40 such that gas 5 releases from tank 11 and flows to transducer 12 when an electrical appliance plugs into electrical outlet 22.

In another embodiment, a feedback signal 30 is generated by electronics 29 and communicated to a pneumatic control valve 31. The feedback signal directs pneumatic control valve 31 to increase flow to transducer 12 when the AC or DC output voltage is less than a desirable voltage range, and to decrease flow to transducer 12 when the AC or DC output voltage exceeds the desirable voltage range. The action of the feedback signal 30 and pneumatic valve 31 may serve the purpose of matching the gas flow into transducer 12 to the output power required, to avoid overpowering or underpowering the attached electrical appliance. Feedback signal 30 and pneumatic valve 31 also serve the purpose of conserving compressed gas 5 (and its inherent stored energy) for use only as needed.

In embodiments using pneumatic control valves 31 or 41, another pneumatic control valve 50 may be used. Pneumatic control valve 50 is normally closed, but may be opened by pushing a button 52, allowing a flow of compressed gas 5 into transducer 12 to begin power generation. This feature serves to override the closure of pneumatic control valve 31 due to initial lack of power to electronics 29, and to override the closure of pneumatic valve 41, allowing power generation even if no appliance is plugged into electrical outlet 22.

Electronics 20 may also detect when the power source is incapable of delivering voltage that is within the desirable voltage range. When this occurs, electronics 20 may disconnect the AC or DC output voltage from output line 21.

Figure 3:
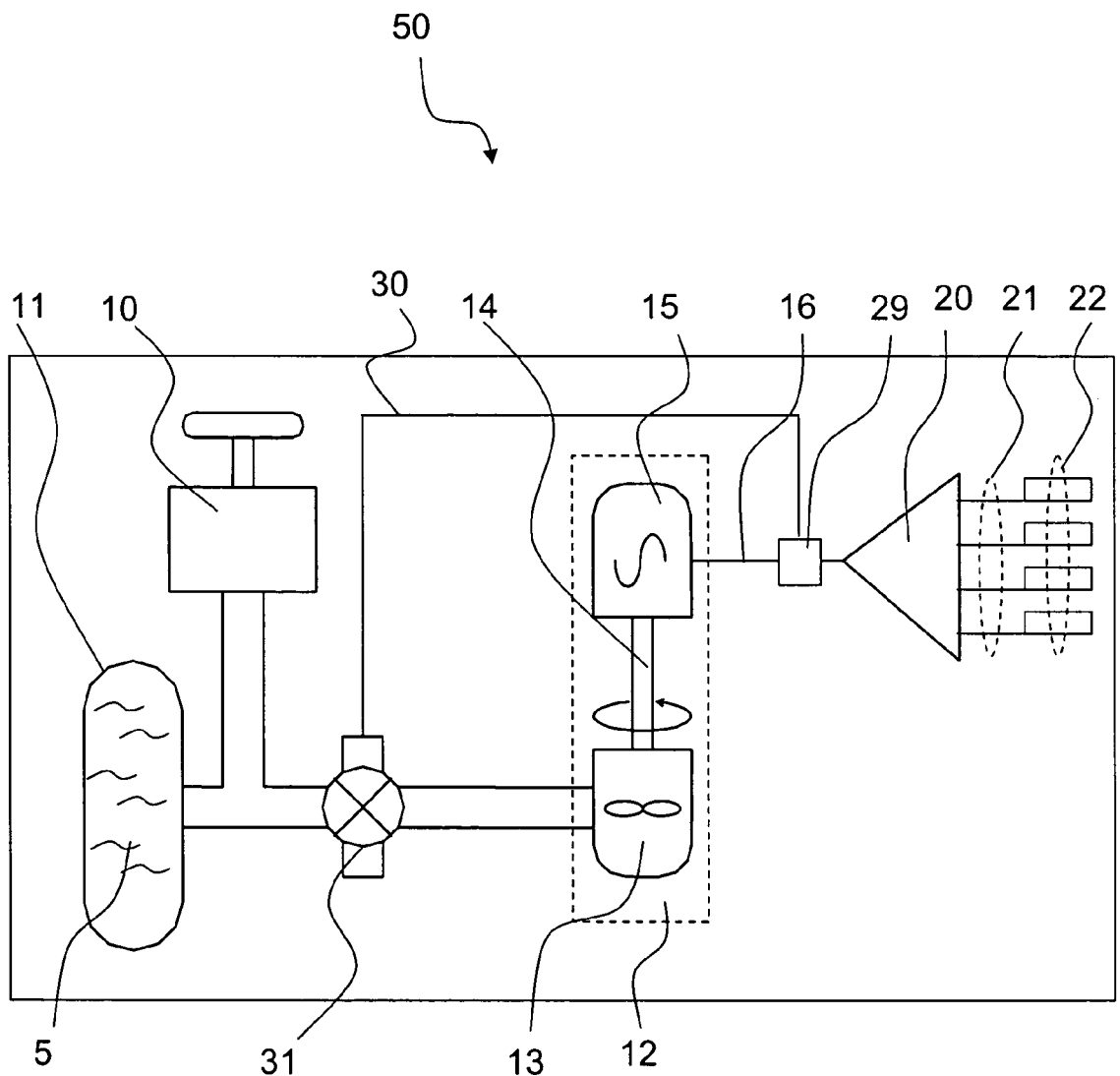
FIG. 3 shows one other electrical power source.

FIG. 3 shows an alternate embodiment power source 50. Manual pump 10 again operates to provide compressed gas 5 into tank 11. When released (e.g., through operation of a mechanical linkage as in FIG. 2, or by some other means), gas 5 passes through pneumatic control valve 31 and to transducer 12, which in this embodiment comprises motor 13, shaft 14 and generator 15. Electrical power produced by generator 15 is output into electrical line 16. The electrical power is regulated by electronics 20 to desired AC or DC voltage at desirable voltage levels (e.g., 12V DC or 120V AC) and delivered into one or more output lines 21. Output lines 21 are connected to electrical outlets 22, to which external devices (e.g., electronic devices requiring power or batteries requiring recharging) may attach. A feedback signal 30 is generated by electronics 29 and delivered to pneumatic control valve 31 to adjust and maintain voltage delivery on output line 21.

Figure 4:
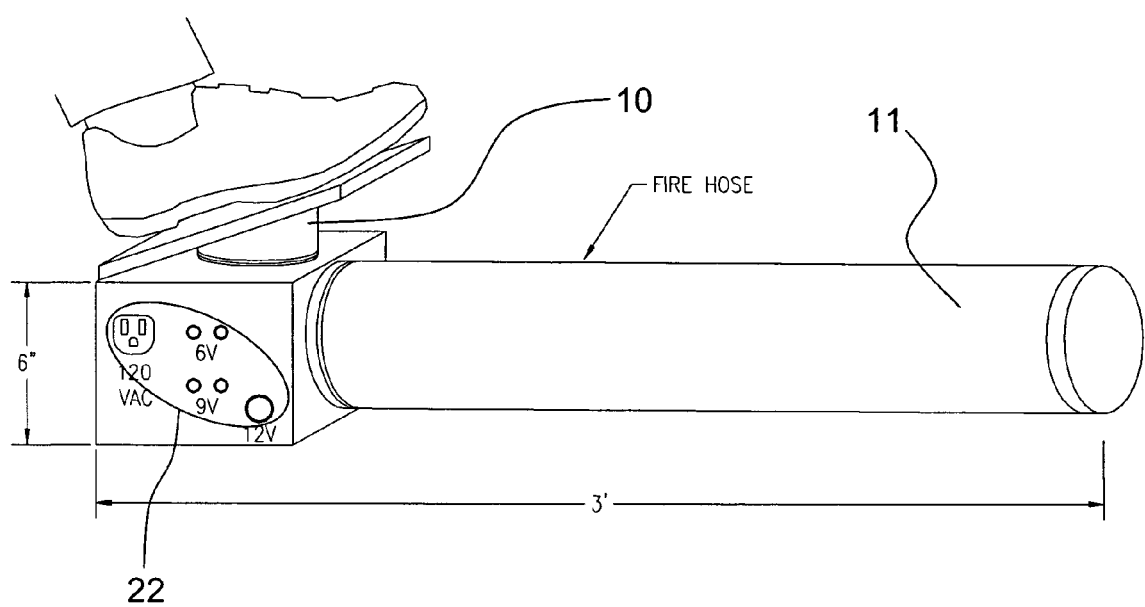
FIG. 4 shows one electrical power source in an illustrated use.

FIG. 4 shows one electrical power source in an illustrated use. In FIG. 4, outlets 22 are formed on a common faceplate, manual pump 10 is in the form of a foot pump, and tank 11 takes the form of a flexible hose (e.g., a fire hose).

Figure 5:
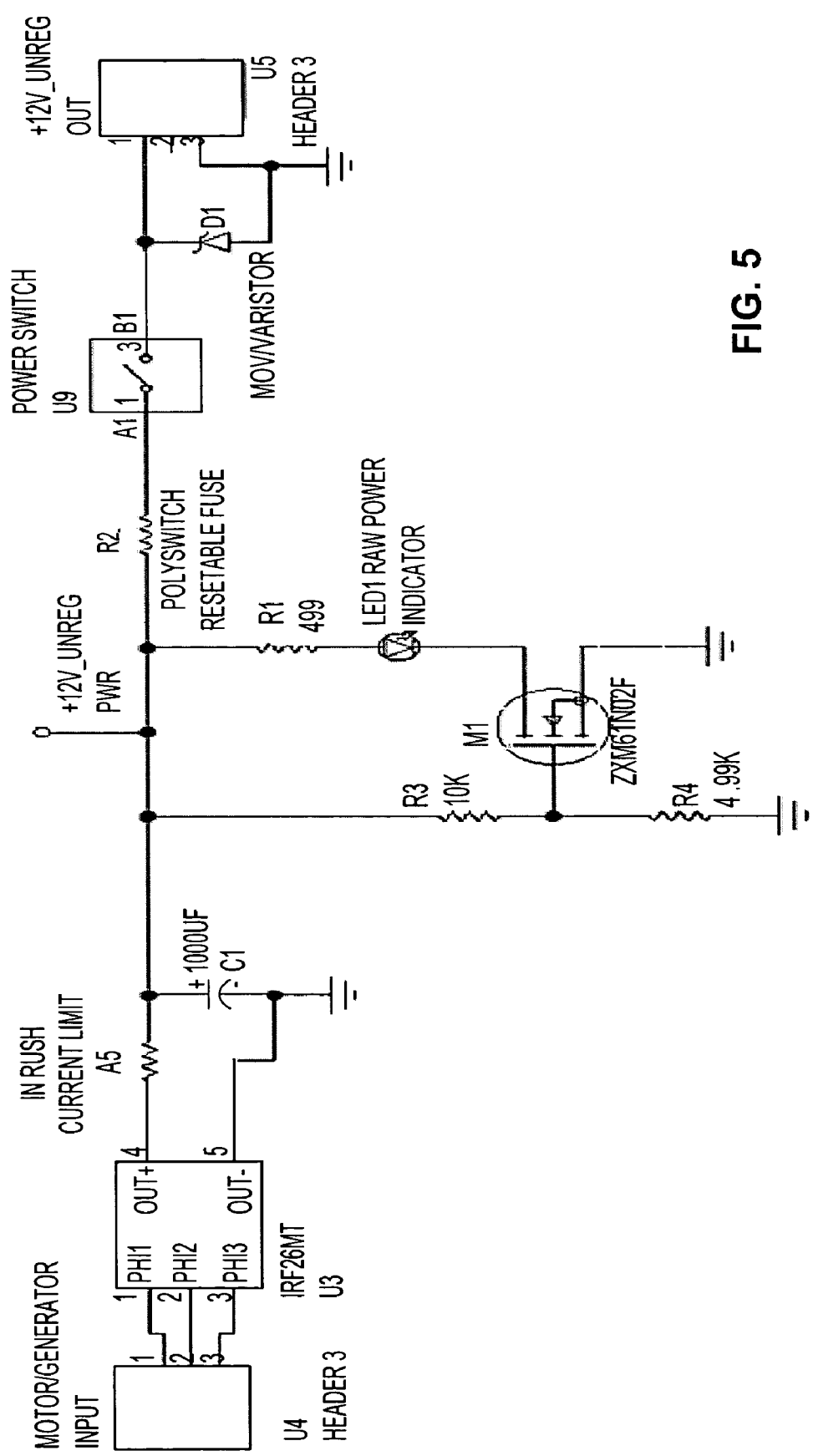
FIG. 5 is a schematic of one circuit for converting raw power output to an unregulated DC voltage.

FIG. 5 shows a non-limiting embodiment of one circuit for converting the raw power output of a transducer to an unregulated DC voltage.

Figure 6:
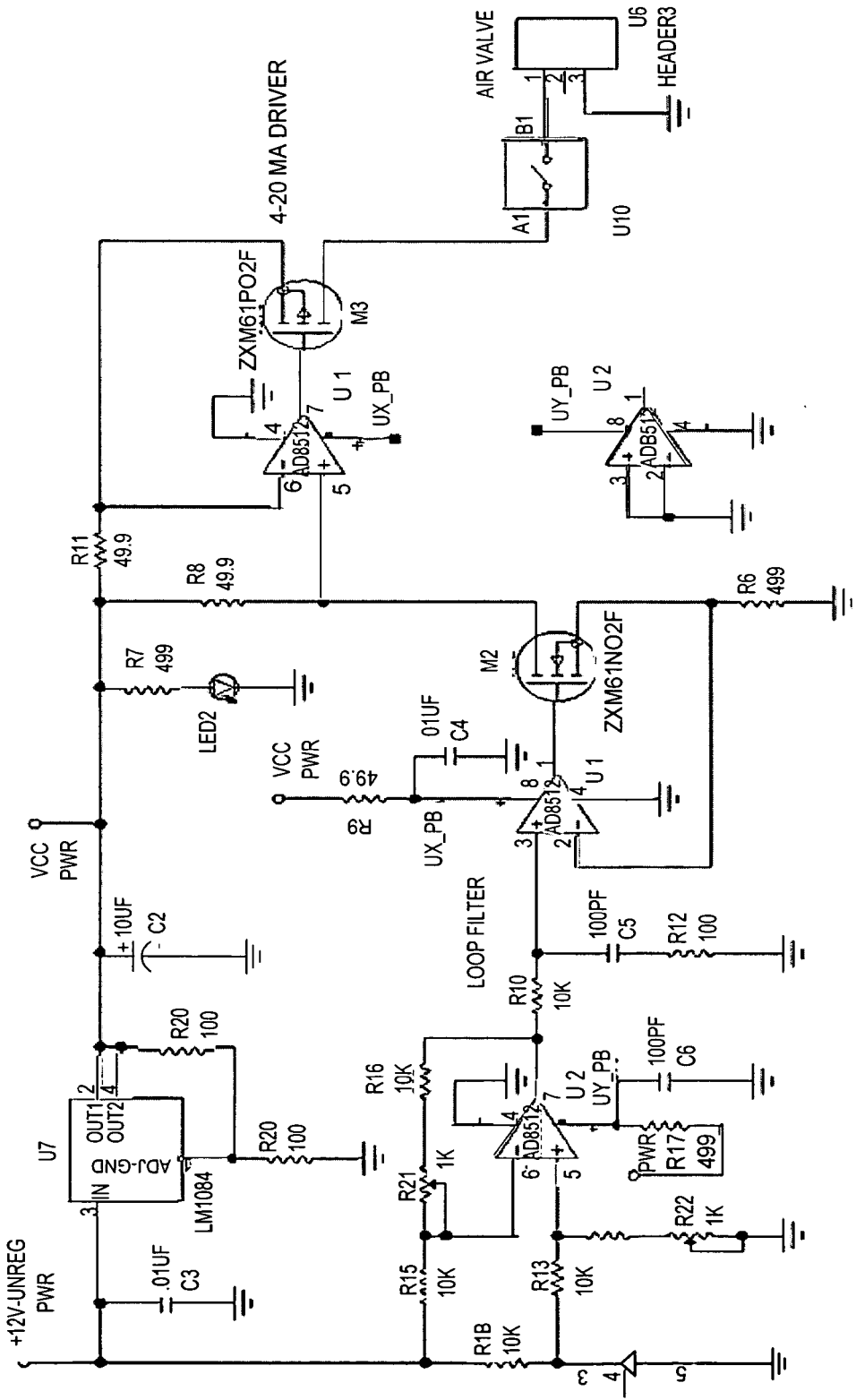
FIG. 6 is a schematic of one circuit for regulating DC voltage and generating a feedback signal.

FIG. 6 shows a non-limiting embodiment of one circuit for (a) regulating a DC input voltage to a regulated DC output and (b) generating a feedback signal operable to open or close a pneumatic valve, to match input power to desired output power.

Figure 7:
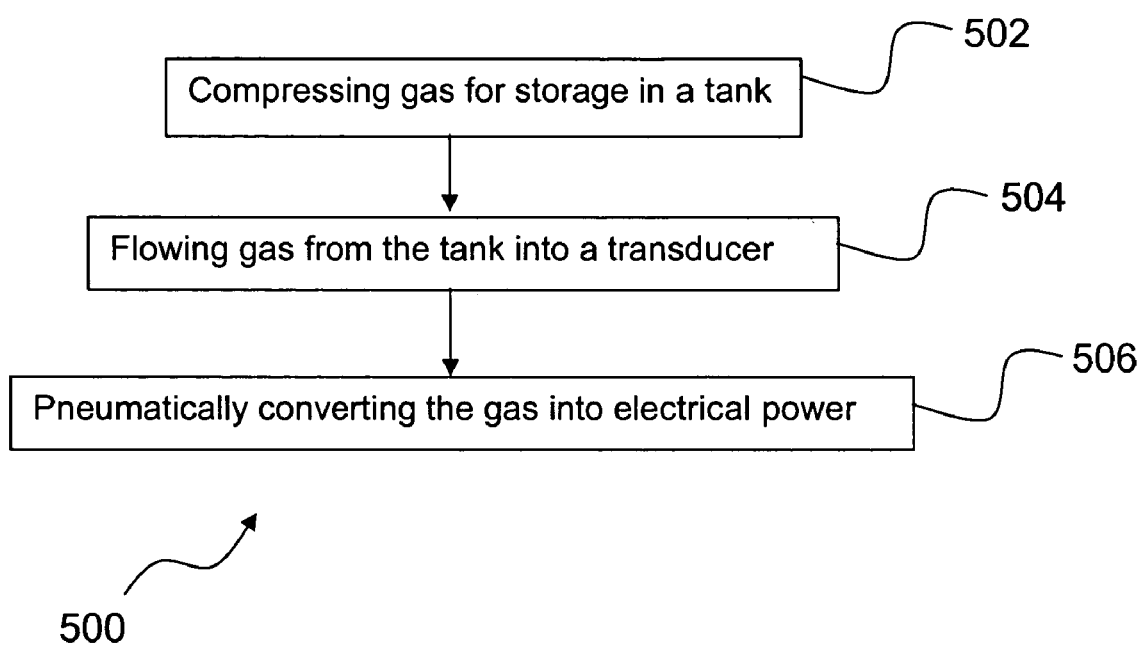
FIG. 7 is a flowchart of a method of producing electrical power.

FIG. 7 shows a flowchart 500 illustrating one method for producing electrical power. In step 502, gas (e.g., air 6) is compressed into a storage tank (e.g., tank 11) such that compressed gas 5 is within tank 11. In step 504, gas flows to a transducer (e.g., transducer 12), which pneumatically converts (in step 506) the flowing gas to electrical power.

Step 506 may also include the step of regulating the electrical power to a desired AC or DC output voltage. By way of example, the output voltage may be regulated to 120V or 12V. Plug-in step-down DC-DC converters may attach thereto to generate other voltages. Step 504 may occur through in response to a particular action, for example by plugging an electronic device into an outlet 22 (which triggers a mechanical or electrical valve that opens a pathway from compressed gas 5 to transducer 12). Optionally, a button may be included with a power source which, when selected, opens airflow between tank 11 and transducer 12. The compressing step 502 may also occur through one of several methods, including any of the following: operating a manual pump; using a chemical generator; using an ignited chemical in a pressure vessel; reacting a mixture of two or more chemicals in a pressure vessel.; using a detonated gas charge; using an ammunition based pressure generator; and using an externally heated pressure vessel.

The systems and methods described hereinabove may thus provide certain advantages. For example, the power source may form a modular unit with modular replacement components. The storage tank may be any known air-tight canister (the canister used with paint ball guns is for example suitable) or tubing (for example fire hose that may be rolled up and easily carried). The transducer may also be a modular replacement component, such as an air motor and generator; and the air motor and generator may share a common shaft. Alternatively, the transducer may comprise a shunt wound motor, with windings on rotor and stator. Even the output elements may be modular, for example including power conditioning plugs or adaptors (e.g., to step down voltage from 120V to 12V or other desired voltage), or battery chargers. In other embodiments, the output elements may be integrated into a common interface. Further, the inflator may be modular, for example comprising a foot pump, bicycle pump, or even shoes that connect with a fire hose "tank" so that simply the act of walking pressurizes air in the tank. Pressurization of the tank may also occur through chemical action, or through operation of an ammunition round such as a bullet or a shotgun shell, such that when the round is fired, the gas pressurizes in the tank. Moreover, the modular power source as described herein may connect to existing pressurization sources so as to provide output voltages; in which case, the tank or pump may be discarded for that immediate application.

Changes may be made in the above methods and systems without departing from the scope hereof. It should thus be noted that that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An electrical power source comprising:
   a tank;
   an inflator for compressing gas into the tank, the inflator configured for operation when unconnected to external electrical power;
   a transducer for pneumatically converting gas from the tank to electrical power;
   electronics operable to derive a feedback signal dependent on an electrical load driven by the electrical power source; and
   a pneumatic valve responsive to the feedback signal to operably adjust flow of the gas to the transducer.

2. The electrical power source of claim 1, wherein the transducer comprises an air motor and an electric generator.

3. The electrical power source of claim 2, wherein the air motor and the electric generator share a common shaft.

4. The electrical power source of claim 1, wherein the transducer comprises a motor.

5. The electrical power source of claim 1, further comprising electronics operable to convert the electrical power into AC output voltage at one or more RMS voltage levels.

6. The electrical power source of claim 1, further comprising electronics operable to convert the electrical power into DC output voltage at one or more voltage levels.

7. The electrical power source of claim 6, further comprising a battery charger connected to the DC output voltage.

8. The electrical power source of claim 1, further comprising bypass gas means operable to allow gas flow directly into the transducer without passing through the pneumatic valve.

9. The electrical power source of claim 1, wherein the inflator comprises a human powered pump.

10. An electrical power source comprising:
a first tank;
an inflator for compressing gas into the first tank, the inflator configured for operation when unconnected to external electrical power, the inflator having a connection to a second tank containing compressed gas; and
a transducer for pneumatically converting gas from the tank to electrical power.

11. The electrical power source of claim 1, wherein the inflator comprises a chemical generator.

12. The electrical power source of claim 11, wherein the chemical generator comprises an ignited chemical in a tank.

13. The electrical power source of claim 11, wherein the chemical generator comprises a mixture of two or more chemicals in a tank.

14. The electrical power source of claim 11, wherein the chemical generator comprises a detonated gas charge.

15. The electrical power source of claim 11, wherein the chemical generator comprises an ammunition based pressure generator.

16. The electrical power source of claim 11, wherein the chemical generator comprises an externally heated tank.

17. The power source of claim 1, further comprising one or more electrical outlets for the electrical power.

18. The power source of claim 17, further comprising a pneumatic valve responsive to mating of a power plug with the electrical outlets to allow the gas to flow to the transducer.

19. The power source of claim 18, further comprising bypass gas means operable to allow gas flow directly into the transducer without passing through the pneumatic valve.

20. The electrical power source of claim 1, wherein the transducer comprises a 3-phase brushless DC motor.

* * * * *